United States Patent
Farkaly (12)

(10) Patent No.: US 6,196,721 B1
(45) Date of Patent: Mar. 6, 2001

(54) SINUSOIDAL VISCOUS INTERFACE FOR ATTENUATION OF VIBRATION FOR BALL AND ROLLER BEARINGS

(76) Inventor: Stephen J. Farkaly, 3115 Wintersong Dr., Idianapolis, IN (US) 46241

( * ) Notice: Subject to any disclaimer, the term of this patent is extended or adjusted under 35 U.S.C. 154(b) by 0 days.

(21) Appl. No.: 09/392,255

(22) Filed: Sep. 9, 1999

Related U.S. Application Data

(60) Provisional application No. 60/099,971, filed on Sep. 11, 1998.

(51) Int. Cl.$^7$ ................................................ F16C 27/00
(52) U.S. Cl. ................................................................ 384/99
(58) Field of Search .............................. 384/99, 535, 581

(56) References Cited

U.S. PATENT DOCUMENTS

| | | |
|---|---|---|
| 1,386,255 | 8/1921 | Hindle . |
| 1,965,293 | 7/1934 | Jungstrom . |
| 2,101,346 | 12/1937 | Robertson . |
| 3,513,480 | 5/1970 | Robinson . |
| 4,440,456 | * 4/1984 | Klusman ........................ 384/581 X |
| 4,775,248 | * 10/1988 | Barbic et al. ......................... 384/99 |
| 4,872,767 | * 10/1989 | Knapp .................................. 384/99 |
| 4,901,014 | 2/1990 | Riegger et al. . |
| 4,992,024 | * 2/1991 | Heydrich ........................... 384/99 X |
| 5,201,585 | 4/1993 | Gans et al. . |
| 5,205,384 | * 4/1993 | Heshmat ............................... 384/99 |
| 5,380,100 | 1/1995 | Yu . |

FOREIGN PATENT DOCUMENTS

| | | |
|---|---|---|
| 299814 | 9/1954 | (CH) . |
| 556981 | 12/1974 | (CH) . |
| 484148 | 9/1926 | (DE) . |
| 1029525 | 6/1953 | (FR) . |
| 2110314 | 6/1983 | (GB) . |
| 1229472 | 5/1986 | (SU) . |

* cited by examiner

*Primary Examiner*—Thomas R. Hannon
(74) *Attorney, Agent, or Firm*—Richard C. Litman

(57) ABSTRACT

A bearing race and ring assembly having an undulating outer surface which mates with an inner surface of the assembly along a mounting interface. The mounting interface includes a plurality of rings packaged to produce inner and outer undulating mating surfaces. A viscous medium for dampening vibrations flows therethrough to reduce bearing vibrations within the race. The undulated surfaces are defined by either sinusoidal or ramped relationship, forming a uniform pitch therethrough and providing a broader effective film layer for vibration attenuation. A hydraulic ball valve system is disposed the housing of the ring assembly for regulating viscous fluid pressure.

11 Claims, 6 Drawing Sheets

SINUSOIDAL VISCOUS INTERFACE FOR ATTENUATION OF VIBRATION FOR BALL AND ROLLER BEARINGS

CROSS-REFERENCE TO RELATED APPLICATION

This application claims the benefit of U.S. Provisional Patent Application Serial No. 60/099,971, filed Sep. 11, 1998.

BACKGROUND OF THE INVENTION

1. Field of the Invention

The present invention relates generally to bearing race vibration dampening. More specifically, the invention is a bearing race and ring assembly which significantly reduces mechanical wear attributed to bearing vibrations by undulating surface lubrication.

2. Description of Related Art

Various bearing races of conventional construction, are used extensively in industry, particularly in rotating machinery. The most significant utility of most bearing races is the application of the bearing races as squeeze film dampers (SFDs). The conventional construction of the squeeze film bearing typically includes a circular bore hydrodynamic bearing, however, the journal does not rotate but oscillates within the circular bore while separated from it by a fluid film. As such, a certain amount of viscous fluid (i.e. an oil lubricant) must be continuously fed to the damper interface to compensate for end leakage. The Reynolds equation has been typically used to predict the oil film pressure assuming constant pressure across the film, constant fluid properties and laminar flow, while ignoring cavitation and inertia effects. Of the lesser researched effects in the SFD fluid film pressures are those caused by Bernoulli effects, that is fluid film pressures are greater in the areas adjacent to a minimum film thickness and conversely. The fluid force in SFD's are notably nonlinear in areas of increased eccentricity ratio, however with reduced viscous dampening. Some of the conventional methods described herein, illustrates some or all of the aforementioned characteristics, however without the benefit of the sinusoidal viscous damper system as herein described. A viscous dampening system which provides enhanced vibration dampening across an expanded viscous surface area or film for reducing mechanical wear and cyclical material fatigue is lacking in conventional viscous dampening ball and roller bearing systems.

For example, U.S. Pat. No. 1,386,255 issued to Hindle et al. discloses a conventional bearing having an interior ring with a slightly greater diameter than the external diameter of the outer ball race concentrically disposed around the outer periphery of the ball race member. The ring is provided with distance pieces arranged at intervals around its outer periphery, those on the inner periphery engaging the outer ball race member and those on the outer periphery with the housing of the bearing. U.S. Patent issued to Jungstrom (U.S. Pat. No. 1,965,293) is of similar construction to that of Hindle et al., except the bearing casing is a dual bearing casing which provide greater bearing surface contact with the rotor shaft.

U.S. Pat. No. 5,201,585 issued to Gans et al. discloses a fluid film bearing having a squeeze film damper tailored to the dynamic vibration of a turbomachine. An inner cylindrical bearing sleeve has a bearing surface immediately adjacent the journal surface. An array of recesses are disposed at the bearing surface which allows fluid for the fluid film to pass through the journal bearing sleeve and into a shallow annular film volume between the bearing surface and the rotor shaft.

U.S. Pat. No. 5,380,100 issued to Yu discloses a squeeze film damper covered by torus shells. The torus shells provide the stiffness within a clearance of the squeeze film, and serve to separate the damping fluid from its lubricating environment. The damper outer ring and the damper inner ring are machined each with a pair of half torus shells which are welded together as a single integrated structure. The fluid is transmitted via drip holes disposed in selective areas within the bearing housing. Other U.S. Patents of general relevance to that of the instant invention are those issued to Robertson (U.S. Pat. No. 2,101,346), Robinson (U.S. Pat. No. 3,513,480), and Riegger et al. (U.S. Pat. No. 4,901,014) which disclose conventional features such as bearing mounting and alignment.

Soviet Union Patent No. 1229472 discloses a bearing damping unit comprising two bushes with opposing trapezoidal teeth mounted concentrically with clearance and having self wedging elements between teeth.

Swiss Patent No. 299814 discloses a bearing housing comprising a planar strip with a single continuous recessed pattern disposed therein. The strip is shaped to form a circular or semi circular sleeve which is apparently within the bearing housing for transmitting fluid according to a periodic or discrete pattern.

Other Foreign Patents which are of particular relevance to the instant invention are (FR 1029525), (DE 484148), (CH 47412) and (GB 2110314) which disclose general bearing interfaces for rotating machinery.

None of the above inventions and patents, taken either singly or in combination, is seen to describe the instant invention as claimed.

SUMMARY OF THE INVENTION

The bearing race and ring assembly according to the invention includes a bearing race having an undulating outer surface that mates with an inner surface of a mounting interface within the assembly. The mounting interface includes a plurality of rings packaged to produce inner and outer undulating mating surfaces. A viscous medium for damping bearing vibrations flows therethrough to reduce bearing vibrations within the race. The undulated surfaces are tunable to either sinusoidal or ramped relationship for viscous lubrication, forming a uniform pitch throughout. A plurality of hydraulic ball valve systems are disposed within the housing of the ring assembly for maintaining a predetermined fluid pressure.

Accordingly, it is a principal object of the invention to provide a bearing race and ring assembly which reduces bearing vibrations in rotating machinery.

It is another object of the invention to provide a bearing race and ring assembly which significantly reduces structural wear between mating surfaces in rotational machinery.

It is a further object of the invention to provide a bearing race and ring assembly which improves the relative life of bearings.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention is directed to a bearing race and ring assembly for reducing vibration attributed to misalignment of rotor journals via a sinusoidal viscous interface. The preferred embodiments of the present invention are depicted in FIGS. 1–8, and are generally referenced by numeral 9.

Figure 1:
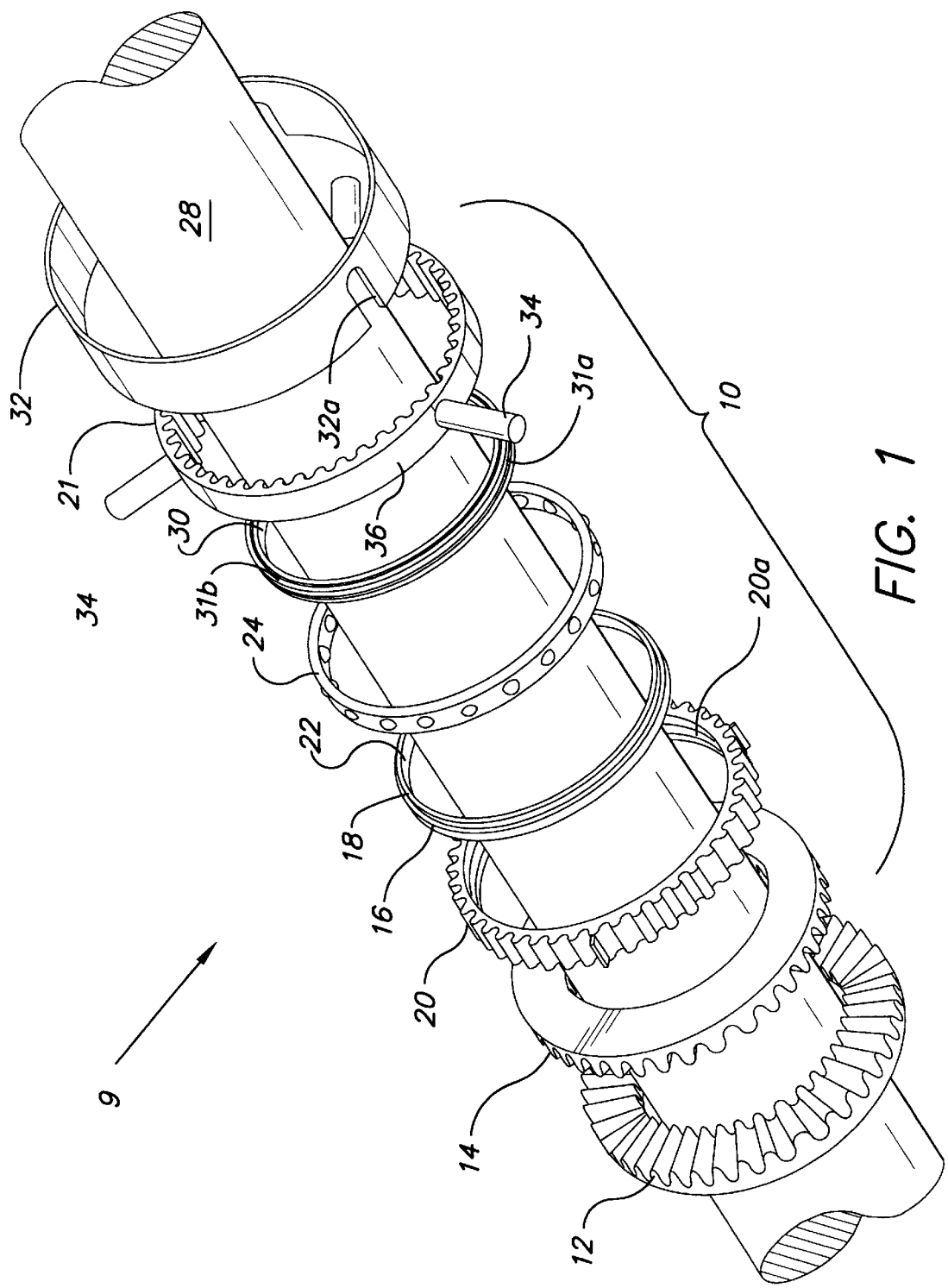
FIG. 1 is an exploded perspective view of a bearing race and ring assembly which provides a sinusoidal viscous interface for attenuation of vibration for ball and roller bearings according to the present invention.
Figure 2:
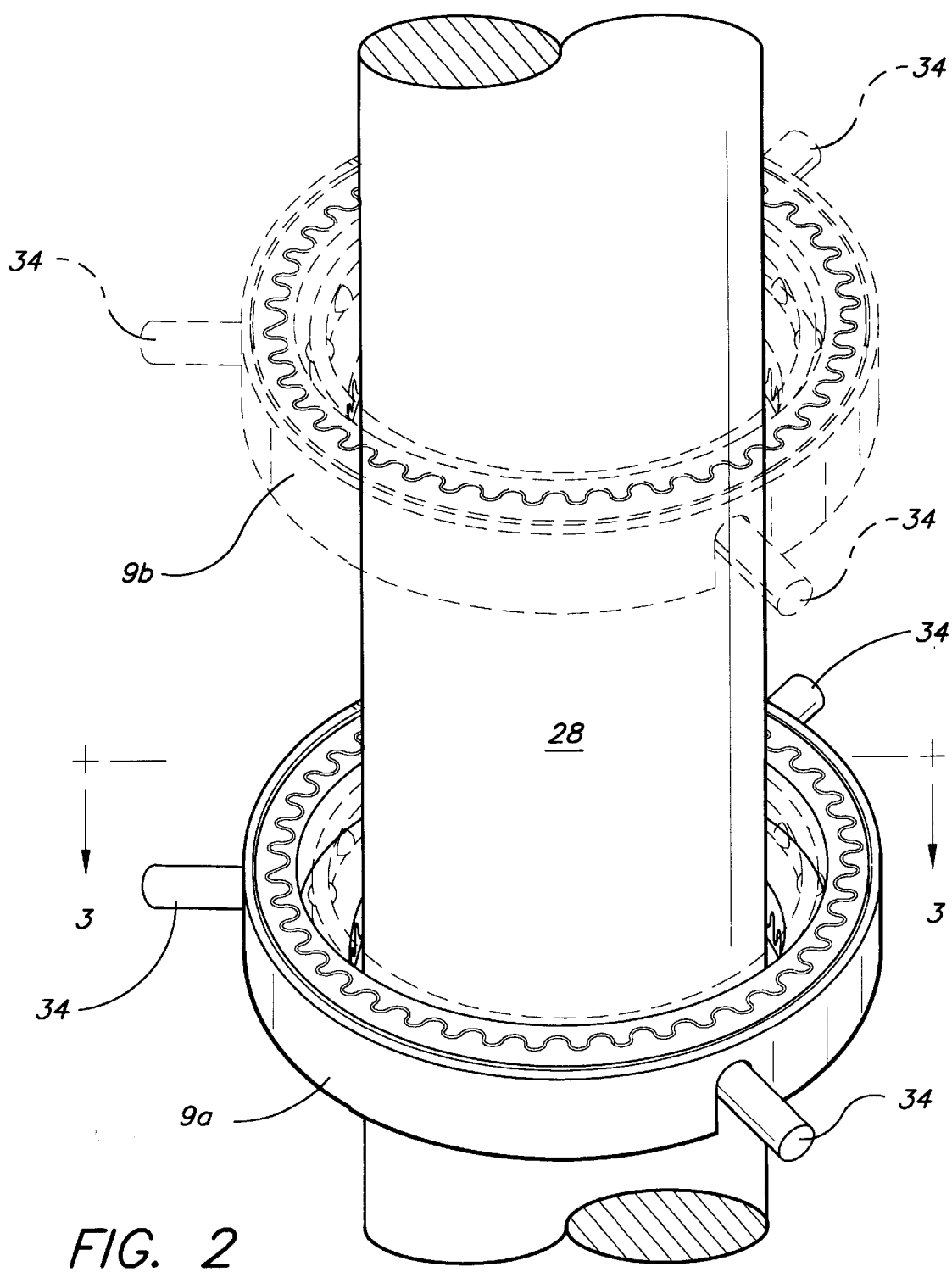
FIG. 2 is a packaged perspective view of FIG. 1 according to the invention.

As best seen in FIG. 1, the bearing race and ring assembly 9 for attenuating vibrations in rotating machinery comprises a plurality of ring elements 10. The plurality of ring elements 10 are shown in exploded view comprising a sinusoidal thrust stationary element 12, sinusoidal thrust transmitting element 14, combination radial transmitting forward seal 16 and radial stationary forward seal 18, sinusoidal radial transmitting element 20 with integral ball race 20a, and a sinusoidal radial stationary element 21. At least one ball bearing split inner race 22 is insertably compacted therein with seals 16 and 18. A ball bearing and cage assembly 24 is disposed adjacent to a ball bearing split inner race 26 which rides a rotating shaft 28. A thrust transmitting outer seal 30 in combination with a rearward transmitting seal 31a and a rearward radial stationary element 31a are disposed within and mates with an interior portion of the housing 32 to form a complete rearward seal of the assembly 9. The housing 32 and ring assembly 9 forms a single unitary packaged bearing 9a and 9b for attenuating vibrations in rotating machinery as diagrammatically illustrated in FIG. 2.

The housing 32 is adapted with a plurality of semi-circular recesses 32a for receiving at least one of the plurality of rings 10 from the assembly 9. The preferred ring disposed within the recesses 32a of the housing 32 is the sinusoidal radial stationary ring element 21 which is adapted with a plurality of hydraulic check ball control valves 34 disposed on an outer wall or peripheral surface 36 of element 21 for regulating internal fluid pressure. The pressure maintained within the assembly 9 according to the instant invention is preferably maintained at 80 pounds per square inch (psi) or up to 350 psi with finite bursts in gas turbine engines.

Racing cars which perform in the Indianapolis 500 typically generate vibrations on turns through the vehicle axle on the order of 80 Hertz (Hz). The ring assembly 9 according to the instant invention will significantly reduce such vibrations including those caused by sub-harmonic resonance and jump phenomena well known to one of ordinary skill in the art. In this regard, a plurality of viscous dampers according to the invention can be used to reduce unwanted axle, rotor or shaft 28 vibrations as diagrammatically illustrated in FIG. 2.

Figure 3:
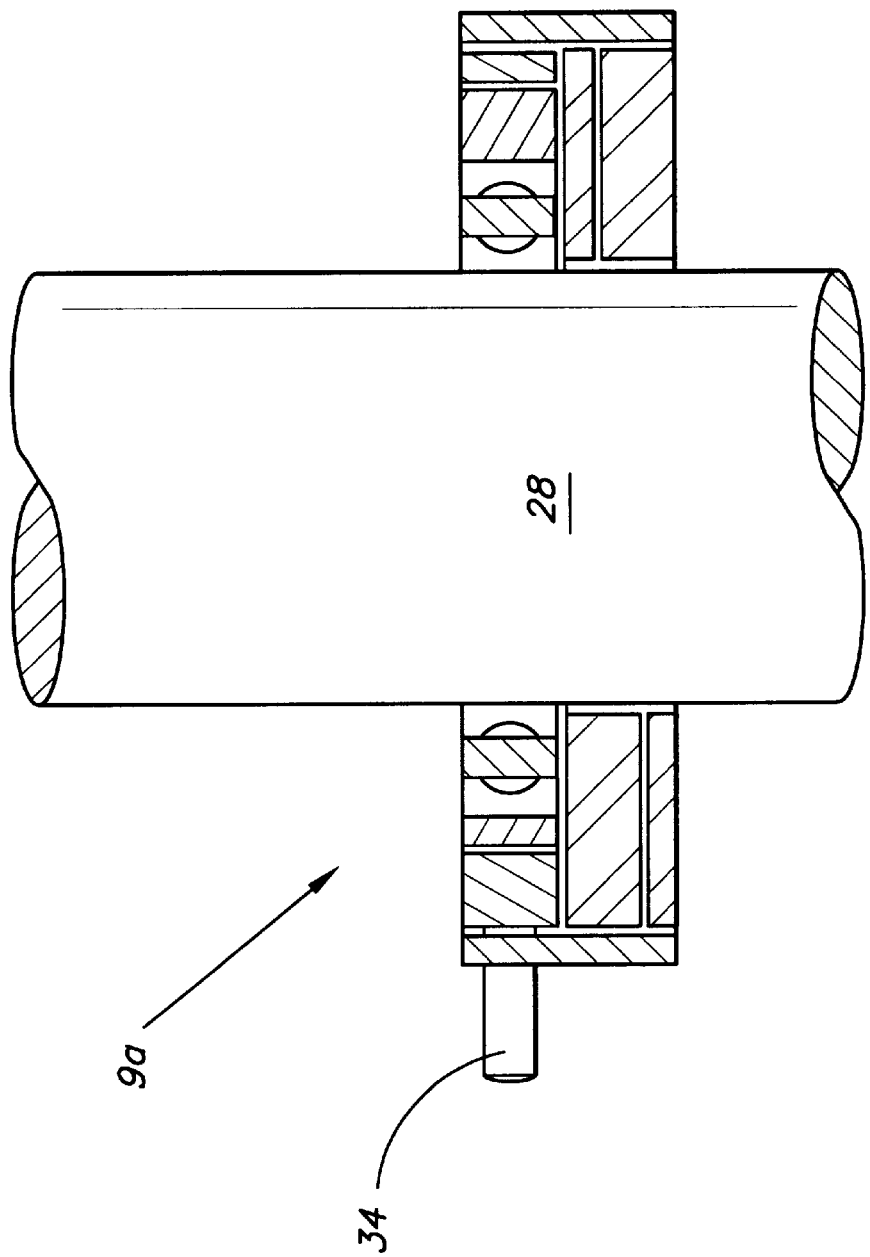
FIG. 3 is a cross-sectional view of FIG. 2 along line 3—3 according to the invention.

A sectional view of the packaged bearing along line 3—3 is diagrammatically illustrated in FIG. 3. A shaft 28 having an angular velocity ω or rotation R is shown with sinusoidal viscous damping according to the invention. The packaged bearing 9a is shown adapted with a hydraulic check ball valve 34. Each check ball valve 34 is charged via oil lines L from an oil pump source or accumulator (not shown). The accumulator or oil pump source is mounted as a remote source for maintaining lubrication as well known in the art.

Figure 4:
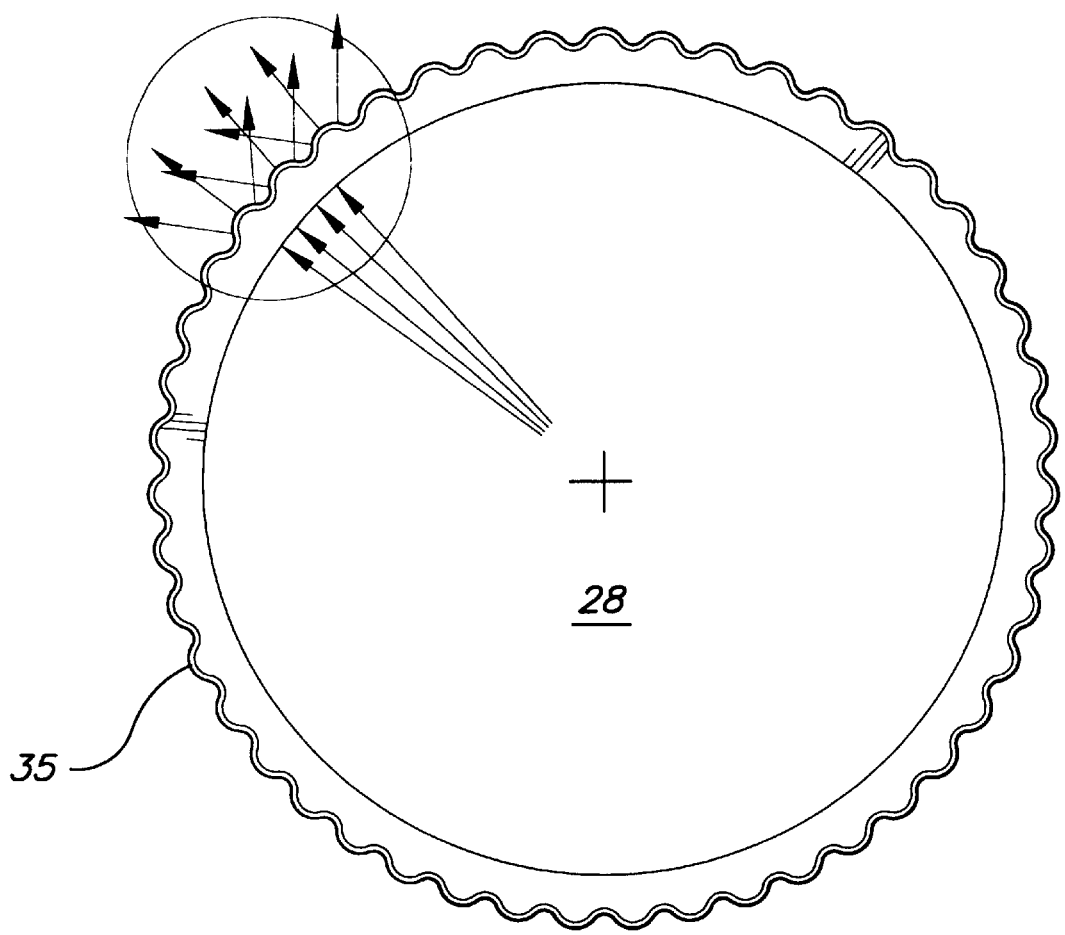
FIG. 4 is a perspective view of the sinusoidal viscous attenuation affect according to the invention.
Figure 5:
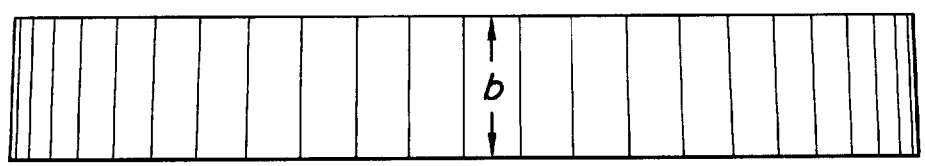
FIG. 5 is a perspective edge view of the sinusoidal viscous attenuation affect of the bearing race and ring assembly according to the invention.

As seen in FIGS. 4 and 5, a tunable sinusoidal viscous film 35 is shown which absorbs or attenuate vibrations everywhere perpendicular to the viscous film 35 from the rotor 28 including the spatial direction b indicated in FIG. 5 per cycle of sinusoidal viscous damping. This method of lubrication is unique in that lubrication occurs across a greater expanded area than with conventional lubrication methods and the amplitude of the lubricant can be varied or tuned as desired by the skilled artisan. The pressure maintained within the assembly 9 for continuous vibration attenuation is preferably 80 psi up to 350 psi for reducing the vibration effects due to sub-harmonic resonance and/or jump phenomena as recited above. Depending on the desired pressure the tuned viscous film would maintain a specific amplitude and frequency (or charge rate) as intended by the skilled artisan.

Figure 6:
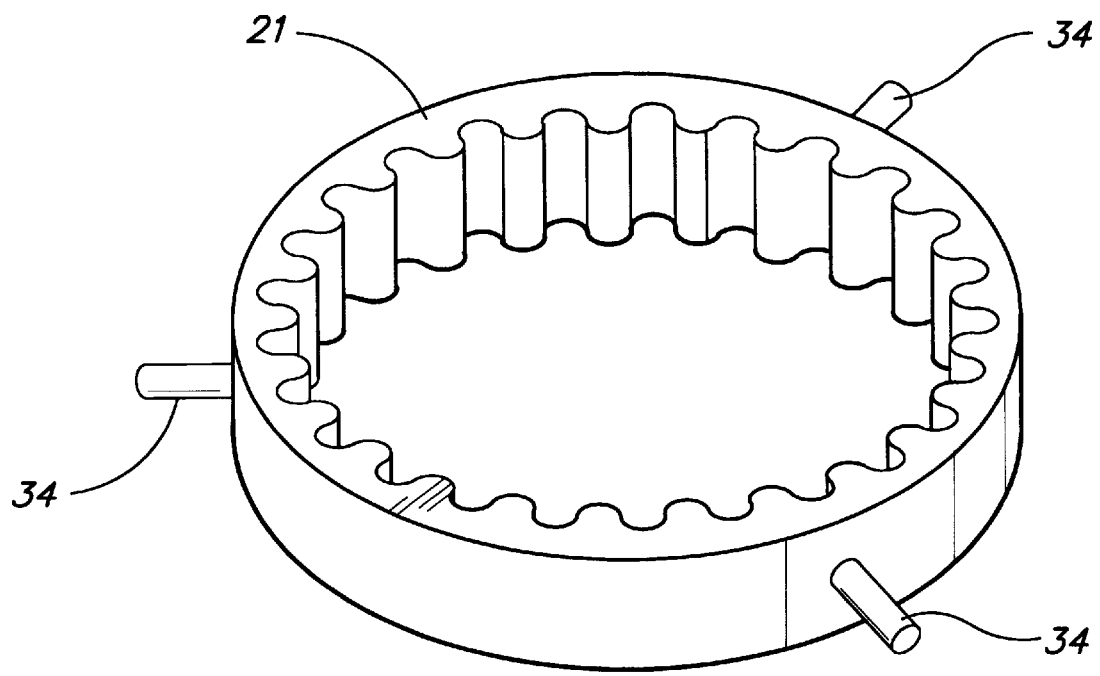
FIG. 6 is a perspective view of a ring element of the bearing race and ring assembly according to the invention, illustrating peripheral hydraulic system attachment.
Figure 7:
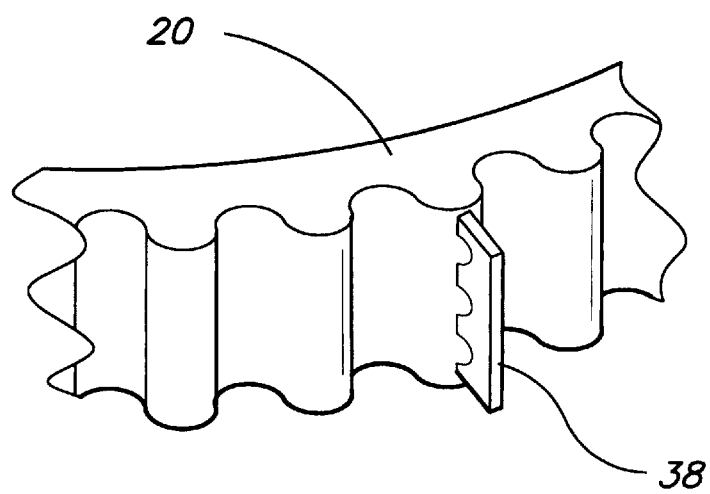
FIG. 7 is a perspective edge view of a ring element of the bearing race and ring assembly according to the invention, illustrating the use of wipers for insertion between mating surfaces.

As seen in FIG. 6, a perspective view of the sinusoidal radial stationary ring element 21 is illustrated, adapted with a plurality of hydraulic check ball control valves 34 disposed on an outer wall or peripheral surface 36 of element 21 for regulating internal fluid pressure. Each check ball valve 34 is preferably disposed on the surface 36 having an angle of 120° between each. This arrangement has been found to maintain uniform pressure throughout the assembly even during the occurrence or effects of jump flux and/or similar external disturbance phenomena. FIG. 7 illustrates a sectional view of the radial transmitting element 20 further comprising a plurality of peripheral wipers or fluid buffers 38 which maintain constant fluid transmission between mating surfaces of elements 20 and 36 in a packaged arrangement 9a or 9b. Each wiper 38 comprises at least one viscous fluid channel disposed as shown in FIG. 7 to provide uniform viscous film flow within elements 20 and 36 respectively.

Figure 8:
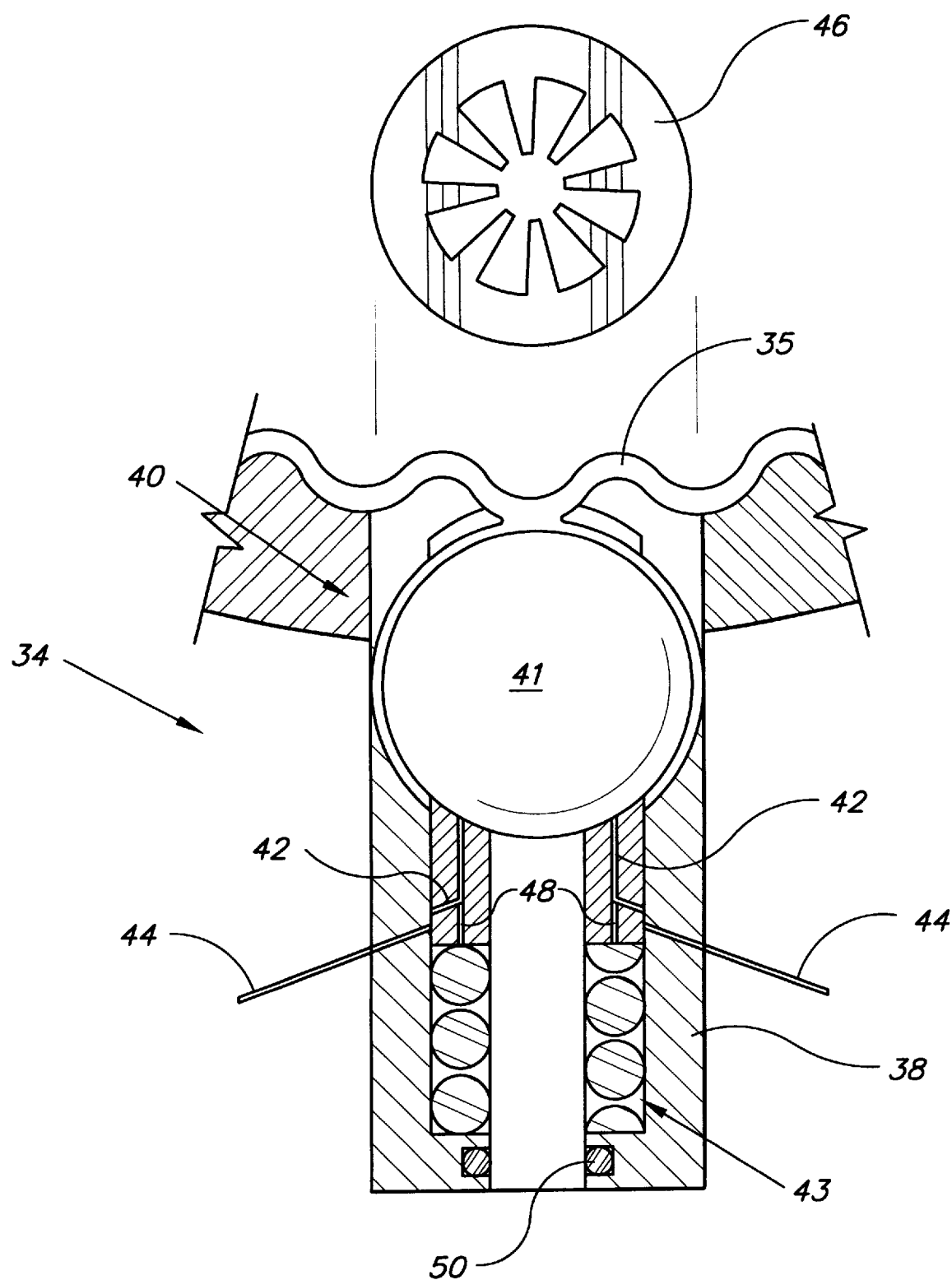
FIG. 8 is a perspective view of the hydraulic control system according to the invention.

With more particularity, the bearing race and ring assembly 9 for attenuating vibrations according to the instant invention maintains a charged sinusoidal viscous film 35, whereby the film 35 is tunable to an amplitude (i.e. selected frequency or rate of the charge oil source.) for absorbing and attenuating induced vibrations in rotating machinery. As seen in FIG. 8, a sectional perspective view of the check ball valve 34 is diagrammatically illustrated having a spring loaded check ball system 40. In cross-section, the system 40 comprises a check ball 41, a spring 43 and dual inner and outer high pressure inlet channels 42 and 44, respectively. Low Pressure fluid F flows through the base of the system 40 from the remote oil source or accumulator (not shown).

The viscous fluid pressure is regulated by the spring loaded check ball valve system 40. In operation, the check ball 41 is compressed by the spring 43 upon experiencing a pressure differential directly related to the result of jump phenomena, etc. This differential pressure forces high pressure inlets 42 and 44 to align thereby allowing high pressure viscous fluid to the check ball valve 34 and ring assembly 9. A check ball stop cap 46 and the inner contour C of the check ball housing 38 prevents the check ball from entering the ring assembly's viscous interface or film 35. High pressure bleed channels 48 control the length of time that the high pressure fluid from the accumulator is introduced into the interface or film 35. A low pressure inlet seal 50 prevents inlet oil leaks from the system 40. Oil lines are adapted to the check ball system in a conventional manner as well known to one having ordinary skill in the relevant art. Some techniques include spring-loaded recessed adapters such as simple mechanical clamp fasteners to do the same. The bearing race and ring assembly for attenuating vibrations according to the invention is made from high temperature tempered metallic material. The preferred material is M50 bearing steel, but can be any of stainless steel, aluminum alloy and titanium alloy, depending on the desired material properties by a skilled artisan. Other materials are included wherein transmitting elements 14 and 20 are constructed from sintered powdered metal, which allows an additional feature of inserting wedge-shaped inserts of very high density material, such as tungsten (having a modulus of elasticity of approximately $102 \times 10^6$ lbs/in$^2$), dispersed symmetrically within, and radially disposed around, the internal construction of the transmitting elements. These tiny wedge shaped inserts increase the effectivity or effectiveness of the transmitting elements, particularly when the point of the wedge is disposed and directed towards the bearing. Noticeably, energies at the lower mechanical frequency range, have shown less need for defocussing via the viscous damper according to the invention.

An alternative notion of the sinusoidal viscous damper according to the invention is the use of the damper as a vibration lens. In this regard, the vibration lens is formed when energy in the form of vibratory waves enters the sinusoidal viscous film or layer 35 by the ball bearing outer track formed integrally therewith. As waves in the mechanical frequency range (i.e. 0–80 Hz) display the tendency to enter a surface normal to the surface as well as exiting normal to the surface as schematically illustrated in FIG. 4. Accordingly, the vibratory energy is propagated or directed as similarly done in geometric optics (i.e focusing/dispersion of light) over a much broader/narrower surface area as desired by the skill artisan. The former as in the instant invention includes the aspect of propagating the vibratory energy over a broader area through the viscous layer as attenuated vibratory energy. This viscous interface 35 also allows, for the first time, the ability to dampen vibrations in the axial plane (i.e via thrust bearings) which provides resistance to non-linear vibration phenomena.

Even in well balanced rotating machinery seriously degenerative conditions develop from sub-harmonic resonances and jump phenomena previously recited above. The sources of this phenomena vary, but are well known to the skilled artisan. The viscous damper or squeeze film damper (SFD) herein disclosed has the advantage in that it employs advanced hydrodynamic sealing between its ring elements to minimize cavitation and associated air-entrapment which leads to destructive and chaotic system motion. Other special aspects of the viscous damper according to the invention include the advantage of returning its bearing to the center in its orbit or rotational motion. The working fluid interface which is typically lubricating oil under pressure (in a rotating gas turbine application), can also be replaced with alternative materials depending on the temperature required for a particular application. This includes the allowable range of relative motion, as well as the availability of pressurized fluid convenient to the relevant system. For instance, to reduce destructive vibration generated by carbon breaks in large jet airline wheel bearing systems, the fluid may be replaced by a solid or semi-solid material, of differing modulus than the transmitting and receiving elements, but with a sufficient transmissibility to perform damping between relative surfaces or laminates thereof, and for directing dissipated energy from the interface to an unpressurized viscous environment, thereby removing virtually all relative motion between sinusoidal elements. Friction between the differing materials typically occur at mating angles of 90 degrees at the interface.

Another instance of application, includes wherein several layers of thin, light laminated shim stock are configured completely around (inside) the sinusoidal interface by alternatively stacking differing modulus materials (i.e.0.005 in. of brass as a first layer, 0.005 in. of stainless steel as a second layer, 0.005 in. of brass as a third layer, 0.005 in. stainless steel as an nth layer, etc.) respectively laminated with a coating of a dry film lubricant. Since the laminated textured or optionally untextured shim stock serves as a substitute of the pressurized fluid, relative motion in the interface must be held to an absolute minimum, particularly under high peak loads or cycles in applications involving large aircraft and racing cars. Thus, depending on the temperature spectrum of the application a number of techniques can be utilized to fill the sinusoidal interface to improve the effectivity of the viscous damper. A sodium filled interface could protect rotating systems employing ceramic bearing components at temperatures where traditional damping media cannot exist (e.g. above 1500 degrees Fahrenheit (F)).

It is to be understood that the present invention is not limited to the sole embodiment described above, but encompasses any and all embodiments within the scope of the following claims.

I claim:

1. A bearing race and ring assembly for attenuating vibrations in rotating machinery comprising:

the bearing race and ring assembly having a plurality of ring elements, said plurality of ring elements comprises a thrust stationary element, thrust transmitting element, radial transmitting forward seal, radial transmitting element with integral ball race, at least one ball bearing split inner race, ball bearing and cage assembly, stationary rearward seal, thrust transmitting outer seal, and a housing, the housing and ring assembly forms a single unitary packaged bearing for rotating machinery, and said housing is adapted with a plurality of semi-circular recesses for receiving at least one of said plurality of rings from the assembly, said at least one of said plurality of rings further comprises a plurality of hydraulic ball control valves disposed on a peripheral surface of said at least one of said plurality of rings for proving and regulating internal fluid pressure.

2. The bearing race and ring assembly for attenuating vibrations according to claim 1, wherein said thrust stationary element, thrust transmitting element, radial transmitting element and radial stationary element are sinusoidal geometric elements.

3. The bearing race and ring assembly for attenuating vibrations according to claim 1, wherein said radial transmitting element further comprises a plurality of peripheral wipers, said wipers having at least one viscous fluid channel disposed therein.

4. The bearing race and ring assembly for attenuating vibrations according to claim 1, wherein said packaged bearing comprises a sinusoidal viscous film, said film having a tunable amplitude for absorbing and attenuating induced vibrations in rotating machinery.

5. The bearing race and ring assembly for attenuating vibrations according to claim 1, wherein said rings are made from high temperature tempered metallic material.

6. The bearing race and ring assembly for attenuating vibrations according to claim 5, wherein said material comprises at least one of M50 bearing steel, stainless steel, aluminum alloy and titanium alloy.

7. A bearing race and ring assembly for attenuating vibrations in rotating machinery comprising:

a bearing race in combination with a ring assembly, wherein said bearing race is at least one of a plurality of ring elements, and wherein said plurality of ring elements comprises a thrust stationary element, thrust transmitting element, radial transmitting forward seal, radial transmitting element with an integral ball race, at least one ball bearing split inner race, ball bearing and cage assembly, stationary rearward seal, thrust transmitting outer seal, and a housing, said housing is adapted with a plurality of semi-circular recesses for receiving at least one of said plurality of rings from the assembly, said at least one of said plurality of rings further comprises a plurality of hydraulic ball control valves disposed on a peripheral surface of said at least one of said plurality of rings for proving and regulating internal fluid pressure, the housing and ring assembly forms a single unitary packaged bearing for rotating machinery, and wherein the thrust stationary element, thrust transmitting element, radial transmitting element and radial stationary element are sinusoidal geometric elements.

8. The bearing race and ring assembly for attenuating vibrations according to claim 7, wherein said radial transmitting element further comprises a plurality of peripheral wipers, said wipers having at least one viscous fluid channel disposed therein.

9. The bearing race and ring assembly for attenuating vibrations according to claim 7, wherein said packaged bearing comprises a sinusoidal viscous film, said film having a tunable amplitude for absorbing and attenuating induced vibrations in rotating machinery.

10. The bearing race and ring assembly for attenuating vibrations according to claim 7, wherein said rings are made from high temperature tempered metallic material.

11. The bearing race and ring assembly for attenuating vibrations according to claim 10, wherein said material comprises at least one of M50 bearing steel, stainless steel, aluminum alloy and titanium alloy.

* * * * *